United States Patent [19]
Hillery et al.

[11] Patent Number: 5,380,019
[45] Date of Patent: Jan. 10, 1995

[54] SPRING SEAL

[75] Inventors: Frank E. Hillery, Cypress; Christel C. Goy, Hacienda Heights, both of Calif.

[73] Assignee: Furon Company, Laguna Niguel, Calif.

[21] Appl. No.: 907,396

[22] Filed: Jul. 1, 1992

[51] Int. Cl.⁶ .............................................. F16J 15/08
[52] U.S. Cl. .................................... 277/236; 277/171; 285/332.2
[58] Field of Search .................. 277/236, 171, 235 A, 277/235 R, 115, 116.8, 181; 285/354, 332.2, 340, 902

[56] References Cited

U.S. PATENT DOCUMENTS

| | | | |
|---|---|---|---|
| 1,426,724 | 8/1922 | Fyffe | 285/332.3 |
| 1,825,962 | 7/1927 | Laird | 285/354 |
| 3,080,171 | 3/1963 | Booth | 277/236 |
| 3,139,294 | 5/1964 | Richards, Jr. | 285/332.3 |
| 3,275,348 | 9/1966 | Scott | 285/332.3 |
| 3,537,733 | 11/1970 | Martin | 277/236 |
| 3,595,588 | 7/1971 | Rode | 277/236 |
| 4,261,584 | 4/1981 | Browne et al. | 277/235 R X |
| 4,477,087 | 10/1984 | Sutter, Jr. et al. | 277/235 A X |
| 4,570,981 | 2/1986 | Fournier et al. | 285/332.3 |
| 4,650,227 | 3/1987 | Babuder et al. | 277/9.5 X |
| 4,819,973 | 4/1989 | Pegon | 285/340 X |
| 5,176,409 | 1/1993 | Brooks | 285/354 X |

FOREIGN PATENT DOCUMENTS 0969210 6/1975 Canada .................. 277/236

OTHER PUBLICATIONS

Brochure (3-page) from Airdrome Parts Co., Long Beach, CA, entitled "Stops Leaks, AP 50 Fitting Seal.".
Declaration Under 37 CFR §1.132 by F. Edward Hillery, dated Sep. 4, 1992.

Primary Examiner—William A. Cuchlinski, Jr.
Assistant Examiner—John L. Beres
Attorney, Agent, or Firm—Christie, Parker & Hale

[57] ABSTRACT

A seal is provided for use with a tube coupling assembly. The tube coupling includes a male fitting having a beveled conical surface on the outside of its end and a female fitting having a beveled conical surface on the inside of its end. The selected angle for the bevels on both the male and female fittings in the same. The seal, which is interposed between the male and female bevel surfaces, comprises a seal body of spring material, such as Inconel 718, coated with a relatively soft metal, such as silver. The seal body and coating combination are configured to include a cylindrical skirt portion and a conical portion extending from the cylindrical skirt portion. The seal is mounted on the male fitting by means of an interference fit between the inner skirt surface and the outside cylindrical surface of the male fitting. The angle between the skirt and the outside surface of the seal's conical portion is different from the selected angle of the bevels on the male and female fittings. A compression nut is provided for drawing the male and female fittings together, forcing the conical portion of the seal into alignment with the male and female fittings. Because of its shape, the seal acts as a Belleville spring and applies independent sealing forces to the male and female bevel surfaces.

23 Claims, 8 Drawing Sheets

SPRING SEAL

FIELD OF THE INVENTION

This invention relates to a seal for use between the sealing surfaces of a tube coupling assembly. The seal is fabricated from a spring material and is configured to exert an independent sealing force on the coupling's sealing surfaces when it is in place in the coupling.

BACKGROUND OF THE INVENTION

Various types of coupling or fitting assemblies are used to connect tubing together in fluid systems, such as aircraft hydraulic and fuel systems. A commonly used coupling assembly incorporates a male fitting having a conical nose which engages a female fitting having a flared or machined conical surface. A compression nut is used to produce an axial force on the male and female fittings so that the surfaces of the fittings are placed under load in metal-to-metal contact with each other.

The axial load initially applied to the fitting surfaces, i.e., the preload, produces a seal which prevents the escape of fluids which are contained under pressure within the coupling and the associated system. As long as the loading force (the preload) on the male and female fitting surfaces provides a unit loading which is greater than the pressure exerted on the surfaces by the fluid contained within the system, the seal is maintained, and no leakage occurs.

Typically, such coupling assemblies are subjected to large temperature fluctuations while in service. As the temperature varies, the components of the coupling (i.e., the male fitting, the female fitting, the compression nut and, where used, an internal lockwire holding the compression nut on the female fitting) expand and contract to various degrees, depending upon the thermal coefficients of expansion of the materials from which they are fabricated. Expansion and contraction results in stress relaxation in the components which, over time, reduces the preload on the male and female sealing surfaces. The loss of preload is more rapid when, as sometimes occurs, the components of the coupling are made of different materials with different coefficients of thermal expansion. The loss of preload continues with time, and at a rate depending on the severity of the temperature cycles, until the preload is reduced to a point at which the fluid pressure overcomes the sealing force, and leakage occurs. Such leakage can be catastrophic if it occurs in systems which contain volatile fluids or in hydraulic systems which rely on the pressure of incompressible fluids.

When there are imperfections, such as scratches or dents in the male or female sealing surfaces, the seal between the surfaces may be compromised, even when the design preload is applied or when only a small portion of the preload is lost due to thermal cycling.

In order to improve the integrity of the seal between the male and female sealing surfaces, seals which are fabricated of soft metals (such as copper, nickel or aluminum) have been interposed between the male and female coupling surfaces. The soft metal seals incorporate a conical portion, which is at the same angle as the male and female sealing surfaces. Once the soft metal seal is in place between the male and female surfaces, an axial force is applied to the fittings by the compression nut, thereby drawing the surfaces toward each other and crushing the soft metal seal therebetween. The metal flows into any surface imperfections in the male and female surfaces, thereby improving the seal integrity.

Although the use of a soft metal seal alleviates problems associated with seal surface imperfections, it does not alleviate the problem associated with loss of preload between the surfaces due to thermal cycling. This is because the soft metal seal does not independently exert any force on the sealing surface once the preload is lost.

It is therefore desirable to provide a seal having a shape and fabricated from a material so that the combination of the shape and the properties of the material enable the seal to exert a sealing force on the male and female surfaces of the coupling assembly in which it is incorporated, even when the assembly preload is lost or is substantially reduced.

SUMMARY OF THE INVENTION

A seal is provided for use with a tube coupling assembly which incorporates a male fitting, a female fitting, and means for drawing the male and female fittings tightly together. The male fitting comprises a cylindrical tube having a beveled conical surface on the outside of its end, with the bevel being at a selected angle with the outside surface of the cylinder wall. The female fitting comprises a cylindrical tube having a beveled conical surface on the inside of its end, with the bevel being at a selected angle with the inside surface of the cylinder wall. The selected angle for the bevels on both the male and female fittings are the same, and the inside diameters of the male and female fittings are such that, when the fittings are drawn together, at least a portion of the male fitting bevel surface is in registry with the female fitting bevel surface.

The seal comprises a seal body of spring metal and a coating of a relatively soft sealing material on the seal body. The seal body and coating combination are configured to include a cylindrical skirt portion, which has inner and outer parallel surfaces defining the cylindrical skirt thickness. The skirt includes means for providing an interference fit between the inner skirt surface and the outside cylindrical surface of the male fitting. A conical portion, which extends from the cylindrical skirt portion toward the skirt axis, has inner and outer parallel surfaces which define the conical portion radial thickness. The angle between the skirt and the outside surface of the conical portion is different from the selected angle of the bevels on the male and female fittings.

In one embodiment, the angle between the skirt and the outside surface of the conical portion is less than the selected angle of the bevels on the male and female fittings. The magnitude of the conical portion selected angle is such that, when the seal is mounted on the end of the male fitting, and the means for drawing the male and female fittings together is finger tight, an annular tip portion of the seal's outer conical surface mates with the corresponding annular portion of the female fitting bevel surface, leaving a gap between the tip portion of the inner surface of the seal's conical portion and the male fitting bevel surface.

In another embodiment, the angle between the skirt and the outside surface of the conical portion is greater than the selected angle of the bevels on the male and female fittings. The magnitude of the conical portion selected angle is such that, when the seal is mounted on the end of the male fitting, and the means for drawing the male and female fittings together is finger tight, an annular portion of the seal's outer conical surface mates with the tip portion of the female fitting bevel surface, leaving a gap between the remaining portion of the female bevel surface and the outer surface of the conical portion of the seal.

In the operation of both of the above-described embodiments, as the male and female surfaces are drawn tightly together, the conical portion of the seal is forced into alignment with the male and female fittings. Because the seal body is made of a spring metal, it applies a sealing force onto the surfaces of the fittings. This sealing force is present even when the initial preload force is lost, e.g., due to thermal cycling.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Figure 1:
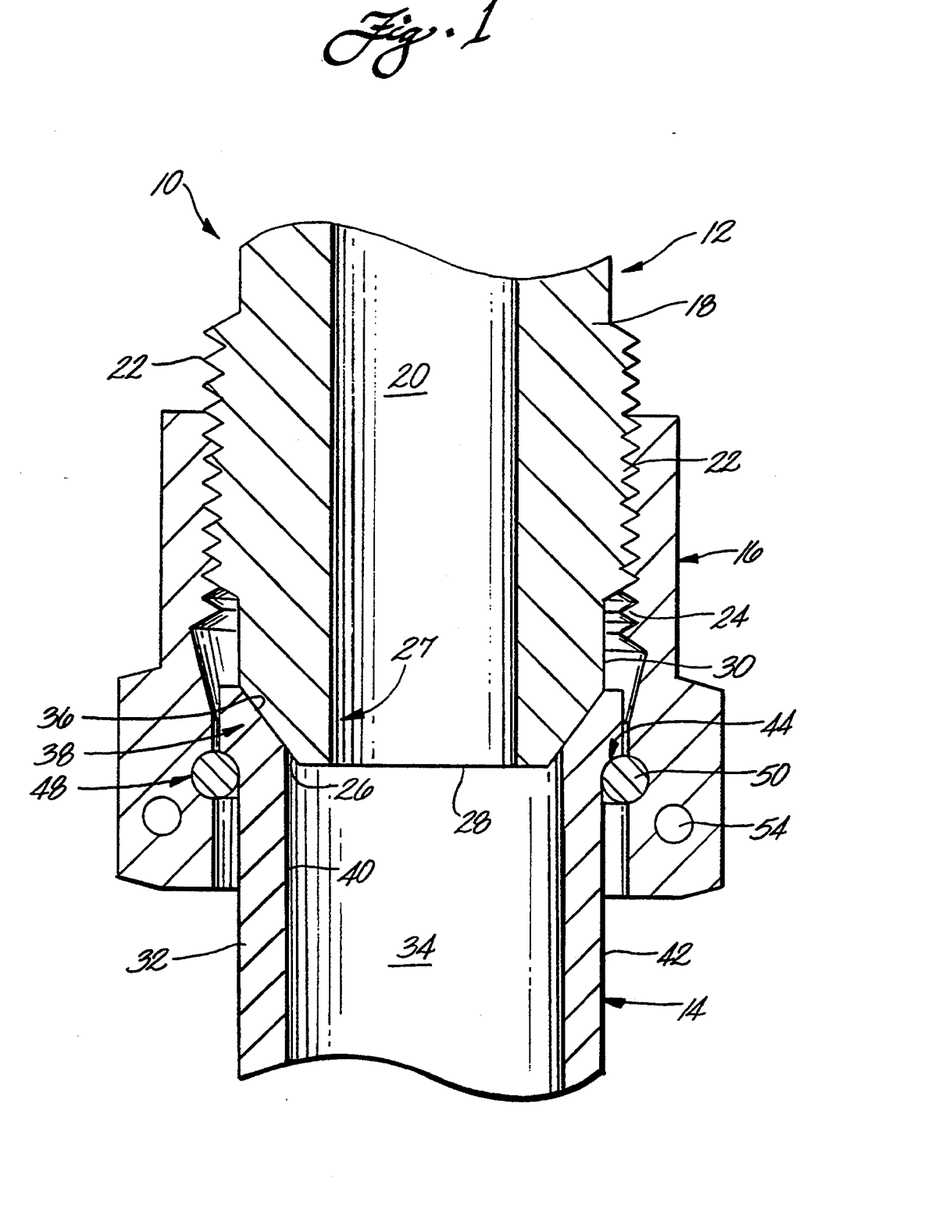
FIG. 1 is a semi-schematic, cross-sectional view of a standard coupling assembly used to connect tubing together in fluid systems, where the assembly incorporates a male fitting having a conical nose which engages a female fitting having a flared conical surface and which incorporates a compression nut to produce an axial force on the fittings.

Referring to FIG. 1, a conventional tube coupling assembly 10 for use in a fluid system, such as in an aircraft hydraulic or fuel system, is shown. The tube coupling 10 includes a male fitting 12, a female fitting 14, and a compression nut 16, each of which is made of metal. The male fitting 12 comprises an elongated cylindrical tube 18 affixed at its end distal the female fitting to another tube or the like (not shown), with an axial bore 20 for transport of fluids along its length through its center. External threads 22 are along a portion of the length of the outside surface of the tube 18 for cooperation with threads 24 on the inside surface of the compression nut 16. The cylindrical tube 18 has a beveled conical surface 26 on the outside of its end 27 which, as is described below in greater detail, cooperates in sealing engagement with the female fitting 14. The bevel surface (or bevel) 26 intersects the fitting's radial end surface 28 and is at a selected angle with the outside surface 30 of the cylindrical tube.

The female fitting 14 comprises an elongated cylindrical tube 32 which is configured to be attached on its end distal the male fitting to another tube or the like (not shown), and has an axial bore 34 along its length through its center for transport of fluids. The cylindrical tube 32 has a beveled conical surface 36 on the inside of its end 38, which, as is described below in greater detail, cooperates in sealing engagement with the male fitting 12. The bevel surface (or bevel) 36 is at a selected angle with the inside surface 40 of the cylindrical wall.

The selected angle of the bevels 26 and 36 on the male and female fittings, respectively, are the same, and the inside diameters of the male and female fittings are such that, when the fittings are drawn together by tightening the compression nut 16, at least a portion of the male fitting bevel surface is in registry with the female fitting bevel surface. In standard tube coupling assemblies, the angle of the male and female bevel surfaces is either 37° or 45°.

Figure 2:
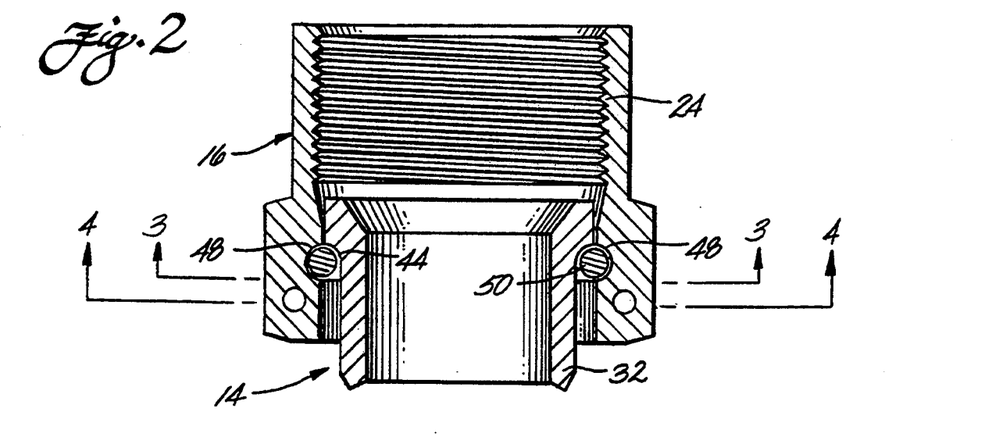
FIG. 2 is a semi-schematic, cross-sectional view of a standard coupling, such as the coupling of FIG. 1, but in the absence of the male fitting component.
Figure 3:
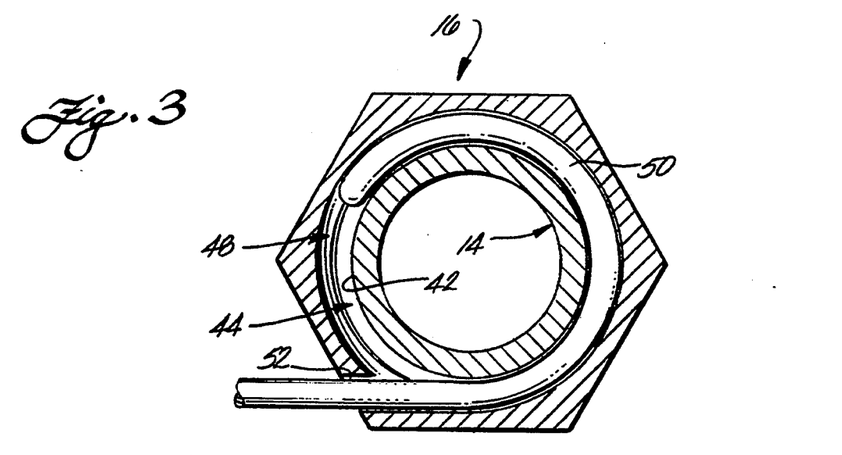
FIG. 3 is a semi-schematic, cross-sectional view taken on line 3—3 of FIG. 2 showing an annular channel formed around the inside surface of the compression nut into which a lockwire is inserted.
Figure 4:
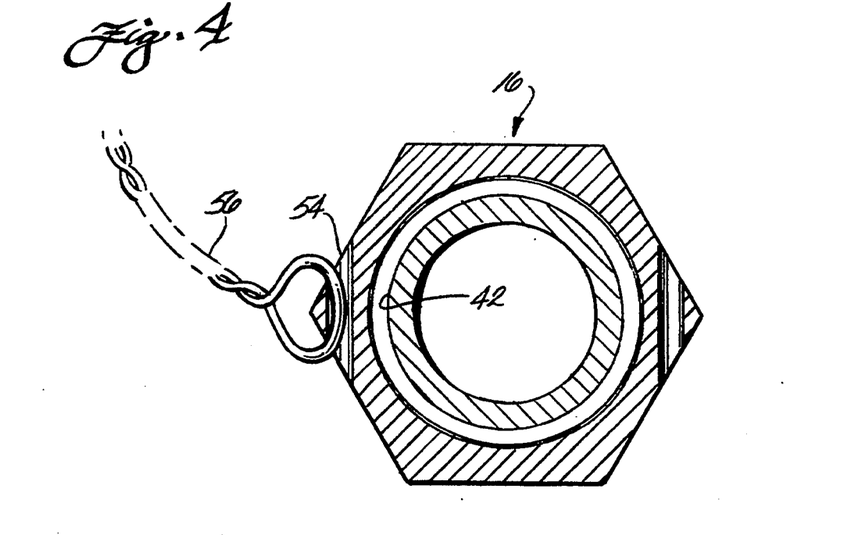
FIG. 4 is a semi-schematic, cross-section view taken on line 4—4 of FIG. 2 showing a hole drilled through a corner of the nut into which a lockwire is inserted for locking the nut against rotation.

Turning to FIGS. 2, 3, and 4, in addition to FIG. 1, the installation of the nut 16 onto the female fitting 14, and the means by which the male and female fittings are drawn tightly together, can be understood. (In FIG. 2, the coupling 10 is shown in the absence of the male fitting.) The outer surface 42 of the female cylindrical tube 32 has an annular shoulder or ferrule 44 on its end proximal the male fitting. An annular channel or groove 48 is around the inside surface of the nut 16 on its end distal the threads 24. A lockwire 50 is in the channel 48 so that, when the nut 16 is moved axially along the female fitting, the lockwire engages the shoulder 44, thereby holding the nut on the fitting.

Turning particularly to FIG. 3, the lockwire 50 is installed by placing the compression nut 16 on the end of the female fitting 14, aligning the groove 48 with the shoulder 44, and then inserting the lockwire 50 through a tangential hole 52 drilled into the nut. Once the lockwire 50 is in place around the entire perimeter of the flange 48, the end of the wire is cut off. Turning now to FIG. 4, in one embodiment, a hole 54 is through one or more corners of the nut 16, and a lockwire 56 is inserted through the hole 54 and preferably tied to a rigid part (not shown) to prevent rotation of the compression nut once installed and tightened.

Turning to FIG. 1, when it is desired to assemble the coupling 10 for use, the compression nut 16, after it has been installed on the female fitting 14 with the lockwire 50 in place, is threaded onto the external threads 22 of the male fitting 12. The male bevel surface 26 and female bevel surface 36 are drawn together in metal-to-metal mating engagement as the nut 16 is tightened. The axial force generated by the engagement of the nut with the helical threads on the male fitting is imparted to the female fitting 14, which compresses the lockwire 50 against the flange 44 as the male and female surfaces are drawn more and more tightly together. After the desired amount of torque has been imparted to the nut, the tightening operation is discontinued. The axial load, which is initially applied to the fitting surfaces by the tightening operation, is called the "preload." The preload force on the male and female bevels holds them in metal-to-metal contact and provides a seal between them, which prevents the escape of fluids contained under pressure within the coupling and associated system.

Loosening of the nut 16 will reduce the preload on the surfaces. In an exemplary embodiment, the lockwire 56 is through the hole 54 in the nut and is connected to a rigid piece of equipment (not shown) to prevent rotation of the nut and resulting loss of preload.

The system can be considered to be spring loaded. The spring components of the system are: (1) the ferrule or shoulder 44, which is under compressive stresses and deforms slightly under the stresses to provide a very stiff (high rate) spring; (2) the lockwire 50, which is under compressive stresses and, like the ferrule 44, is a stiff, high rate spring; (3) the nut 16, which is in tension and is also a stiff, high rate spring due to its configuration; (4) the threads on the nut and on the male connector, which are under compressive and bending stresses, thereby also providing another stiff, high rate spring component; and (5) the male connector, which is in compression and, thus, is another stiff, high rate spring component. The total deflection of the system is very small due to the high spring rate of the components of the system.

In a conventional coupling assembly, such as the coupling assembly 10 described above, as long as the preload on the fitting surfaces provides a unit loading which is greater than the pressure exerted on the surfaces by the fluid contained within the system, the seal is maintained, and no leakage occurs. There is a problem, however, with such couplings losing preload after they are placed in service. For example, such couplings are commonly used in systems which are subjected to large temperature fluctuations. Expansion and contraction of the coupling during temperature excursions results in stress relaxation in the components which, over time, reduces the preload on the male and female sealing surfaces. The loss of preload is more severe when the components of the coupling are made from different metals. When this is the case, during temperature cycles, the components expand at different rates and in different amounts. This differential expansion results in stresses being introduced into the coupling components, which contributes to the loss of preload. The loss of preload continues with time, and at a rate dependent on the severity of the temperature cycles, until the preload is reduced to a point at which the fluid pressure overcomes the sealing force, and leakage occurs.

Figure 5:
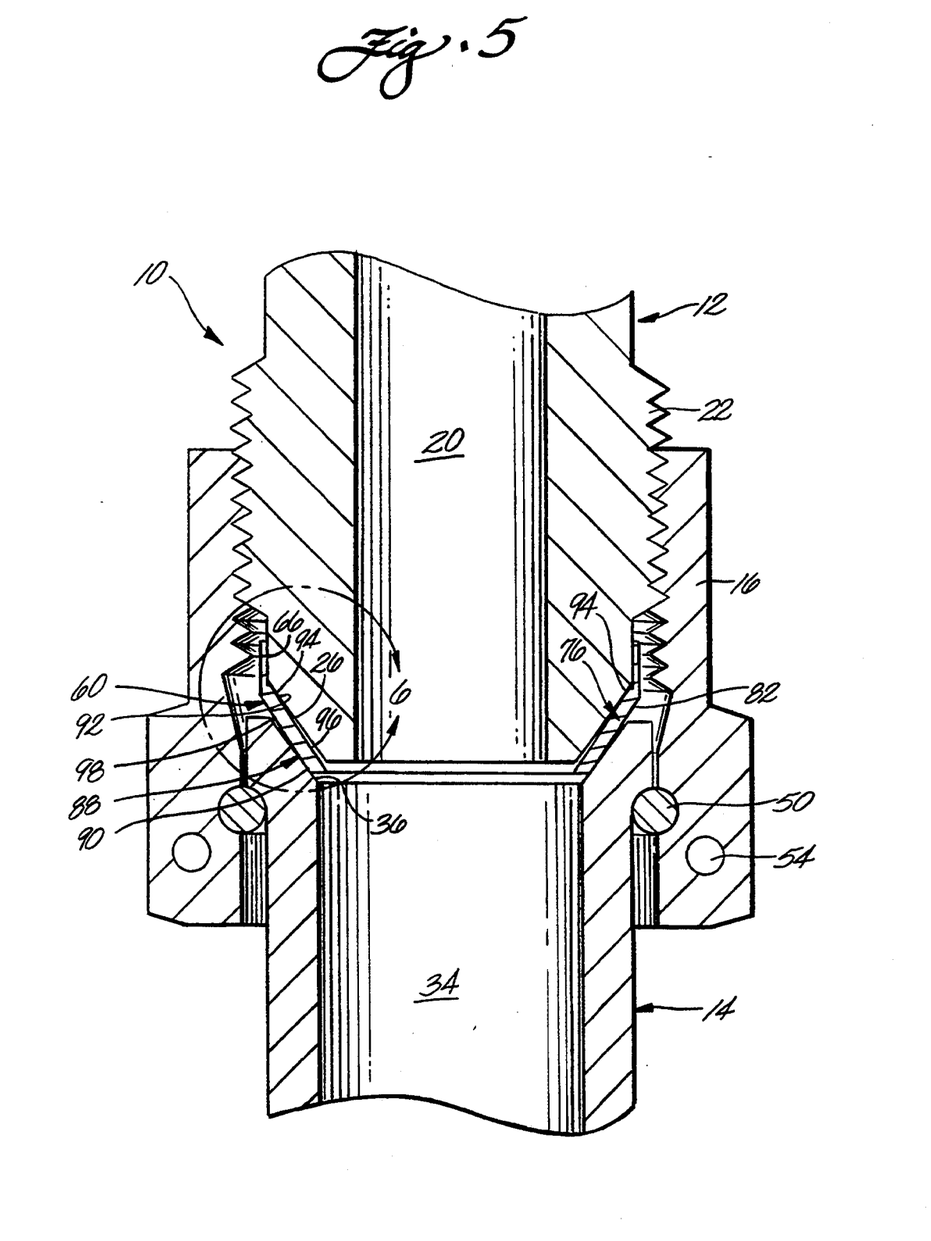
FIG. 5 is a semi-schematic, cross-sectional view of a standard coupling as is shown in FIG. 1, in which is mounted one embodiment of a seal provided in accordance with practice of principles of the present invention where the coupling nut is in finger-tight engagement.
Figure 6:
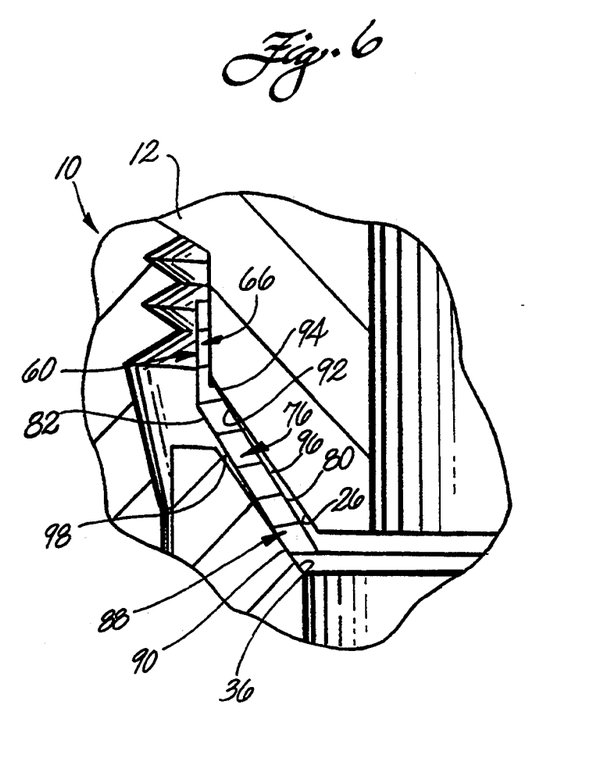
FIG. 6 is a semi-schematic enlarged view taken within the circle 6—6 of FIG. 5.
Figure 7:
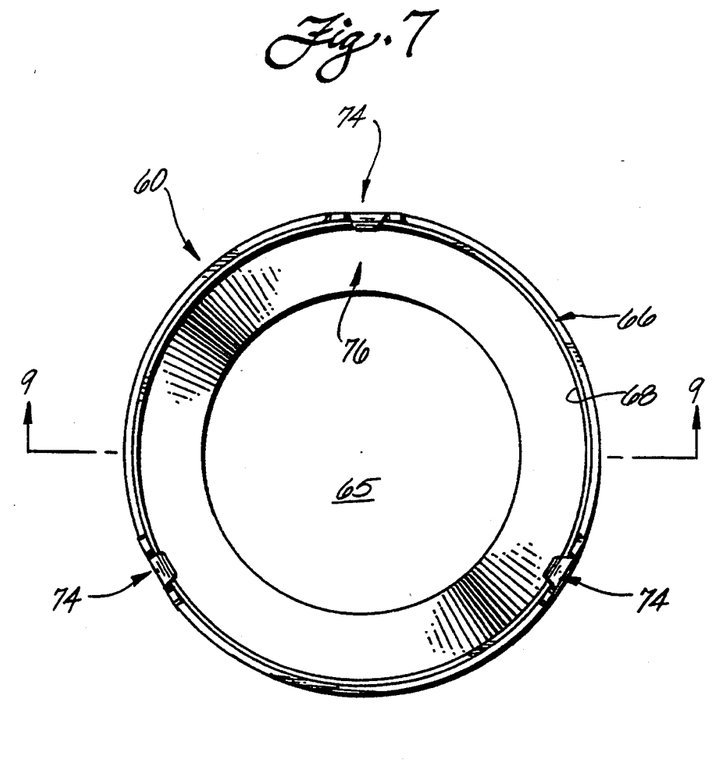
FIG. 7 is a semi-schematic top plan view of the seal shown in FIG. 5.
Figure 8:
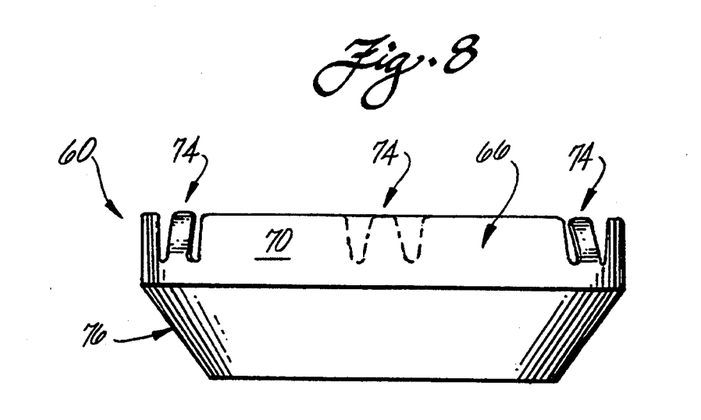
FIG. 8 is a semi-schematic side elevational view of the seal shown in FIG. 5.

Referring now to FIGS. 5 and 6, there is shown a coupling assembly 10 which is identical to the coupling described with reference to FIGS. 1-4, but in which is mounted a seal 60 which is provided in accordance with the present invention to eliminate the problems associated with loss of preload. The seal 60 is shown interposed between the male fitting 12 and the female fitting 14, with the nut 16 being in a "finger-tight" or no-load condition.

Figure 9:
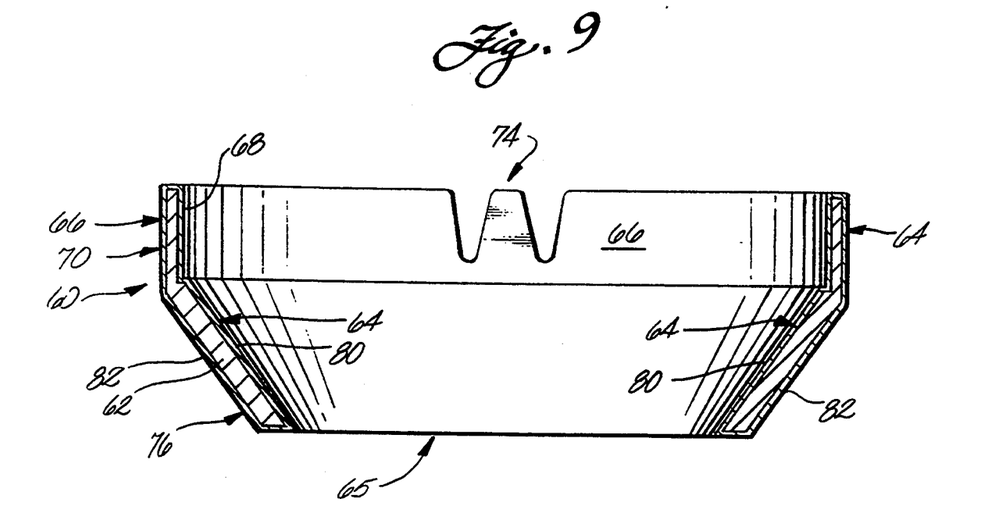
FIG. 9 is a semi-schematic, cross-sectional view taken on line 9—9 of FIG. 7, which shows the seal body and a coating on the seal body, where the thickness of the coating relative to the thickness of the seal body is made disproportionately thick for clarity of illustration.
Figure 10:
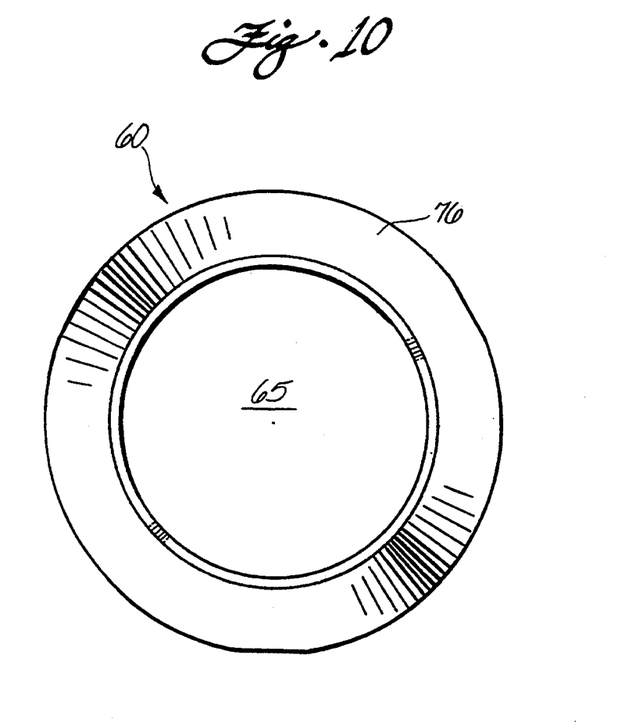
FIG. 10 is a semi-schematic bottom plan view of the seal shown in FIG. 5.

Turning to FIGS. 7-10, and particularly to FIG. 9, the seal 60 comprises a seal body 62 of spring metal on which a coating 64 of a relatively soft material has been applied. (For ease of illustration, the thickness of the coating 64 is shown substantially greater relative to the thickness of the material of the seal body than is actually the case. For example, in one embodiment, where the seal body is of Inconel 718 and the coating is silver, the coating is from about 0.0007 to 0.001 inch thick, while the thickest portion of the seal body is 0.025 inch.)

The term "spring metal" as used herein means metals or metal alloys which have a yield strength at room temperature of greater than 150,000 psi. Non-limiting examples of such metals are stainless steel materials designated PH 13-8 Mo, 15-5 PH, Custom 455, 17-4 PH, PH 15-7 Mo, and Rene 41, as well as Inconel 718. The term "relatively soft" coating material as used herein means a material which has a characteristic such that it can conform to the bevel surfaces and can flow into any nicks or cracks which may be present in the bevel surfaces when they are drawn together under preload to thereby provide an enhanced seal. Preferably, the "relatively soft" materials useful in accordance with practice of the present invention are those which have a Vicker hardness in the range of from 23 to 28. Non-limiting examples of such materials are copper, aluminum, nickel, and silver.

Turning again to FIGS. 5-8, and 10, in addition to FIG. 9, the seal 60 is open through its center 65 and incorporates a cylindrical skirt portion 66 which surrounds the opening and has inner and outer surfaces 68 and 70, respectively, which define the cylindrical skirt thickness. A series of circumferentially spaced tabs 74 (best seen in FIGS. 7-9) extend slightly inwardly and, in the illustrated embodiment, are spaced approximately 120° apart around the top of the cylindrical skirt. The tabs 74 provide an interference fit between the inner surface 68 of the skirt 66 and the outside cylindrical surface 30 of the male fitting to thereby hold the seal on the fitting. In another embodiment, instead of the tabs 74, a plurality of flats are provided around the circumference of the top surface of the skirt to provide the interference fit.

The seal 60 also has an open conical portion 76 which depends from the skirt 66 and which extends toward the axis of the cylinder that defines the skirt. As is best seen in FIG. 9, the conical portion 76 has inner and outer parallel surfaces 80 and 82, respectively, which define the conical portion radial thickness of the seal.

In practice of the present invention, it is required that the angle between the seal cylindrical skirt 66 and the outside surface 82 of the seal conical portion be different from the selected angle of the bevels 26 and 36 on the male and female fittings 12 and 14, respectively. In an exemplary embodiment of practice of the present invention, and as is best seen with reference to FIGS. 5 and 6, the angle between the cylindrical skirt 66 and the outside surface 82 of the seal conical portion 76 is less than the angles of the bevels on the male and female fittings. In a particular embodiment, the angle of the bevels is 37°, while the angle between the skirt 66 and conical portion 76 is 35°. The angle can be slightly more than 35° or can be less than 35°, as desired. Because the bevel angles are different from the angle of the seal conical portion, the seal conical portion does not mate snugly with the bevels when the seal is on the male fitting and the coupling is in its finger-tight condition. In this configuration, an annular tip portion 88 of the seal's outer conical surface mates with the corresponding annular tip portion 90 of the female fitting's bevel surface 36, and a tip portion 92 of the seal inner conical surface mates with the corresponding portion 94 of the male bevel. An annular gap 96 is between the seal's inner conical surface 80 and the male bevel 26, and an annular gap 98 is between the seal's outer conical surface 82 and the female bevel 36.

Figure 11:
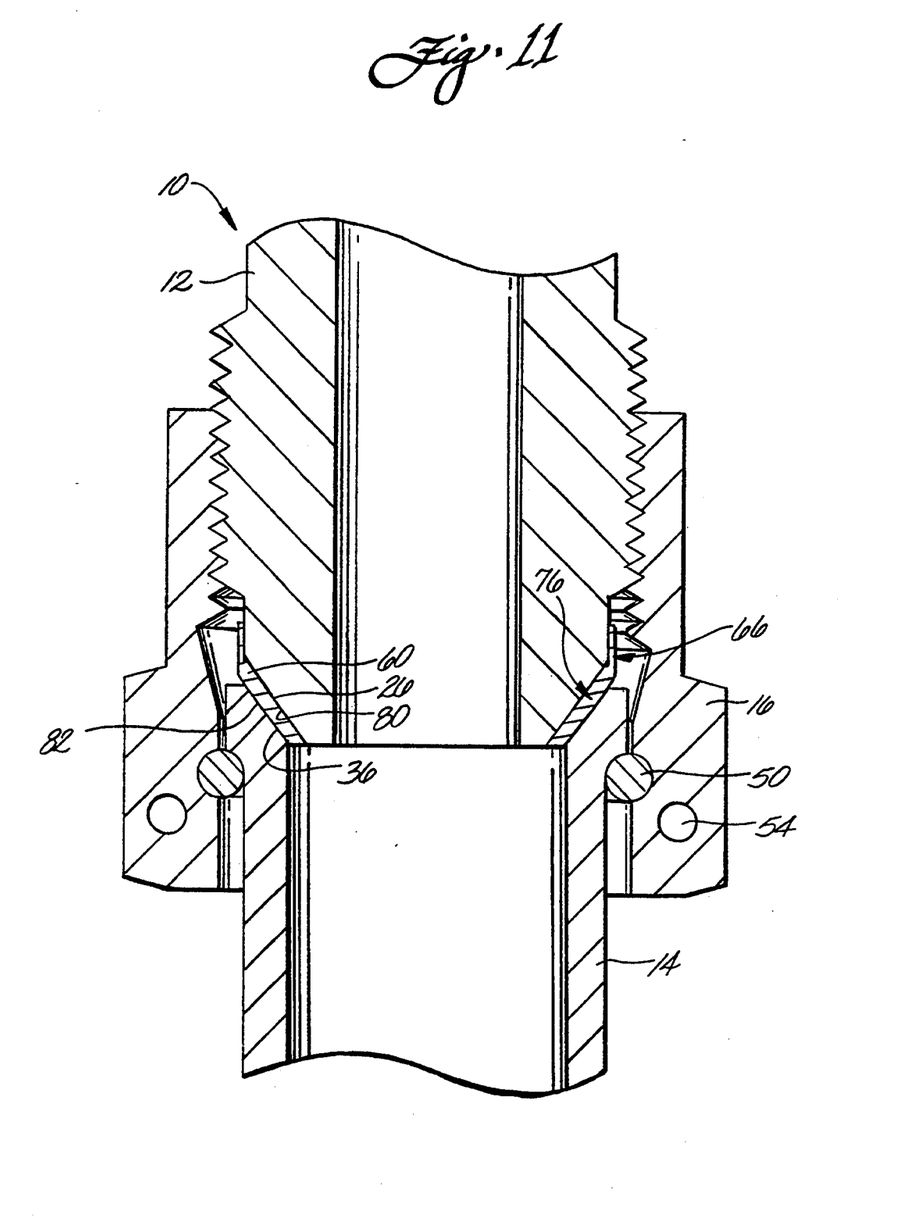
FIG. 11 is a semi-schematic, cross-sectional view showing the coupling assembly of FIG. 5, where the nut has been torqued from its finger-tight to its tightened position, drawing the male and female fittings tightly together, causing the seal to become aligned with the fittings.

In order to provide the desired seal, the coupling nut 16 is tightened from its finger-tight condition, as shown in FIGS. 5 and 6, to its fully tightened condition, as shown in FIG. 11. As the axial force on the male and female fittings is increased, drawing them more closely together, the seal 60 is compressed between the male and female bevel surfaces. As is best seen in FIG. 11, when the compression nut has been tightened to provide the desired preload, the seal 60 mates snugly with the beveled conical surfaces of the male and female fittings. The seal's inner conical surface 80 is aligned with and is flush against the bevel surface 26, eliminating the gap 96 which was present in the finger-tight configuration; the seal's outer conical surface 82 mates with the female bevel surface 26, eliminating the gap 98. As the nut is tightened, the soft sealing material comprising the coating 64 flows into any scratches or nicks which may have been in the male or female bevel surfaces, thereby enhancing the seal.

Because of the shape of the seal 60 (prior to its being compressed between the male and female bevels), and because it is fabricated from a spring metal, the seal acts like a Belleville spring when used as described above. Thus, after the seal 60 is compressed between the male and female bevels by the preload, thereby changing its shape, it exerts an independent force on the bevel surfaces as it attempts to return to its original shape. The forces exerted by the spring seal 60 act as sealing forces and are independent and in addition to the axial preload applied by the nut 16. Thus, when the coupling 10 (and associated seal 60) is subjected to thermal cycling, and, as a result of the cycling, the preload is reduced or even eliminated, the seal 60, acting like a Belleville spring, continues to provide an independent sealing force to the male and female bevels. The force provided by the seal 60 is maintained, in part, because the seal has a lower spring rate, due to its Belleville spring shape, than do the other components of the system.

EXAMPLE

One embodiment of a seal 60 provided in accordance with practice of the present invention has a body fabricated of Inconel 718 and a coating of silver. The cylindrical skirt has a thickness of 0.010±0.001 inch, while the thickness of the conical portion is approximately 0.025 inch. The height of the seal from the top of the cylindrical skirt to the bottom of the conical portion is 0.263±0.005 inch, with the internal diameter of the cylindrical skirt being 0.770 inch, and the internal diameter of the opening at the bottom of the skirt being 0.556 inch. The silver coating is 0.0007 to 0.001 inch thick, and the angle between the cylindrical skirt and the conical portion is 35°. When the seal 60 provided in accordance with this example is mounted on a coupling where the male and female bevels are at 37°, a gap 96 of approximately 0.006 inch is between the inner surface of the conical portion and the outside surface of the male bevel at its tip.

It is calculated that when the seal of this example has been placed in a coupling under an axial preload of 30,000 pounds, it will independently exert a spring force of approximately 1000 pounds on the male and female bevel surfaces. This spring force will continue to be present as the preload on the coupling is lost and, indeed, will be present to provide a sealing force even as the preload goes to zero.

Once a determination is made of the desired independent sealing force that is to provided by the spring seal 60 of the present invention, the selection of a material and the desired thickness of the conical portion, the desired angle between the conical portion and the cylindrical portion, and other design perimeters, can be readily determined by those skilled in the art.

Figure 12:
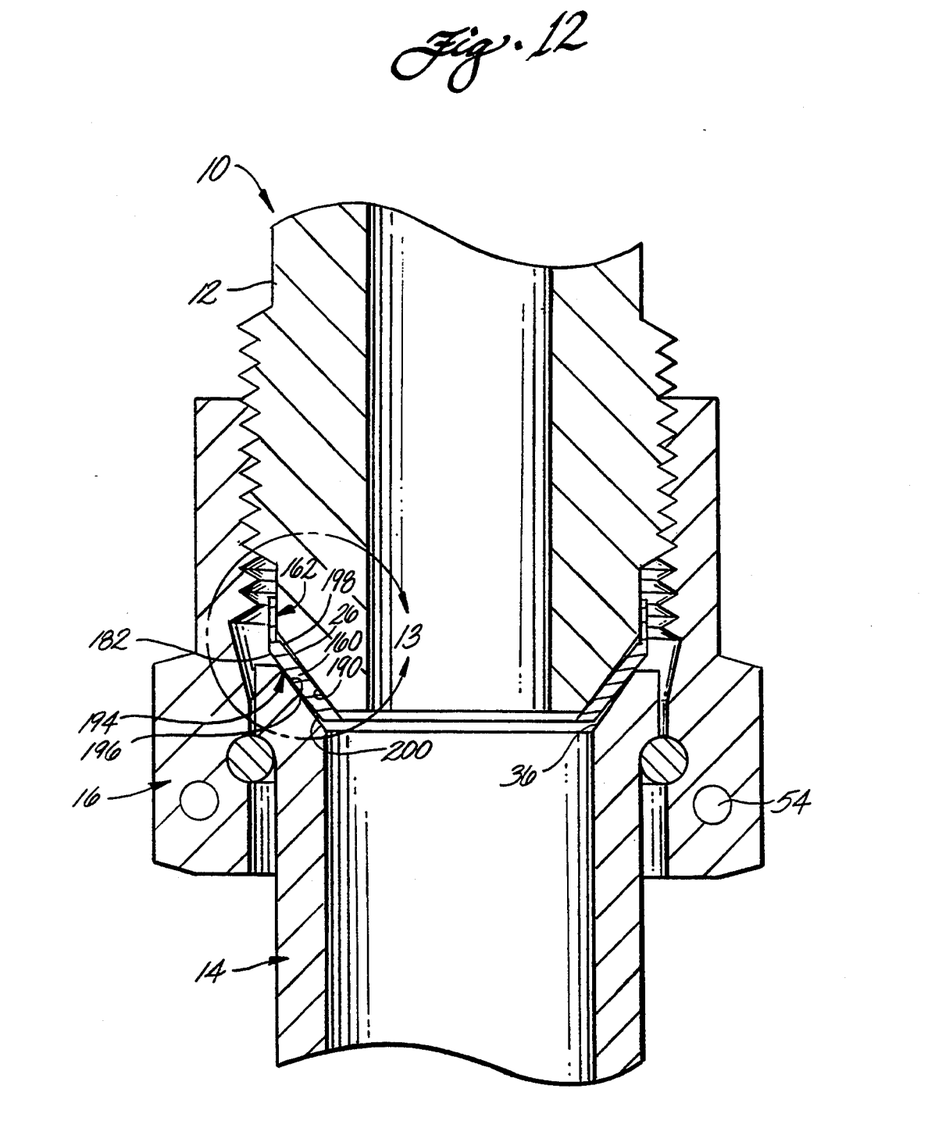
FIG. 12 is a semi-schematic, cross-sectional view of a standard coupling assembly, such as the assembly shown in FIG. 1, in which is mounted a second embodiment of a seal provided in accordance with practice of the present invention.
Figure 13:
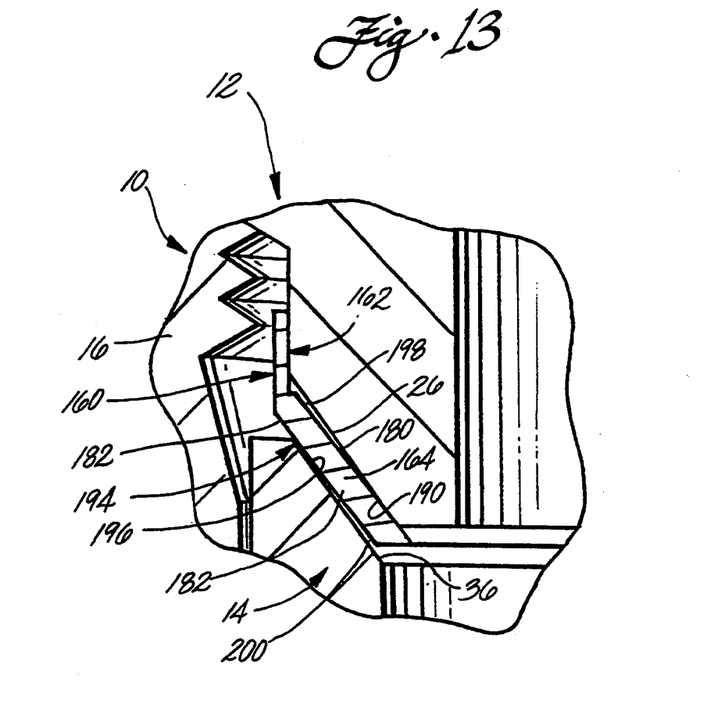
FIG. 13 is a semi-schematic enlarged view taken within the circle 13—13 of FIG. 12.

Turning to FIGS. 12 and 13, there is shown another preferred embodiment of a seal 160 provided in accordance with practice of the present invention. The only difference between the seal of the prior embodiment and the seal 160 of the present embodiment is the angle between the cylindrical skirt and the conical portions. In this embodiment, the angle between the cylindrical skirt 162 and the outer surface 182 of the conical portion is greater than the angle of the bevels 26 and 36 on the male and female fittings 12 and 14, respectively. As was the case with the seal 60, because the angle between the cylindrical skirt 162 and the seal's outer surface 182 is different from the angle of the bevels 26 and 36, the conical portion of the seal does not mate snugly with the male and female bevels. An annular tip portion 190 of the seal's inner conical surface 180 mates with a corresponding annular portion 192 of the male fitting bevel conical surface 180, while an annular portion 194 of the seal's outer conical surface 182 mates with a corresponding tip portion 196 of the female bevel 36. An annular gap 198 is between the seal's inner conical surface and the male fitting bevel, and an annular gap 200 is between the seal's outer surface and the female fitting bevel. In this embodiment, when the compression nut 16 is tightened, the seal will again conform to the male and female bevel surfaces and fit snugly therebetween. In an exemplary embodiment, the angle of the male and female bevels is 37° and the angle between the cylindrical skirt 162 and the outer surface 182 of the conical portion is 39°. The angle can be slightly less or can be more than 39°, if desired.

As was the case with the seal 60, the seal 160 is made of a spring metal and, thus, will exert an independent sealing force on the male and female bevel surfaces 26 and 36 as it attempts to return to its original shape.

The above description of preferred embodiments of the spring seal of the present invention are for illustrative purposes. Because of variations which will be apparent to those skilled in the art, the present invention is not intended to be limited to the particular embodiments described above. The scope of the invention is defined in the following claims.

What is claimed is:

1. A seal for use with a tube coupling assembly, the assembly comprising a male fitting, a female fitting, and means for drawing the male and female fittings tightly together;

the male fitting comprising a cylindrical tube having a beveled conical surface on the outside of its end, the bevel being at a selected angle with the outside surface of the cylinder wall;

the female fitting comprising a cylindrical tube having a beveled conical surface on the inside of its end, the bevel being at a selected angle with the inside surface of the cylinder wall, wherein the selected angle for the bevels on the male and female fittings are the same, and the inside diameters of the male and female fittings are such that, when the fittings are drawn together, at least a portion of the male bevel surface is in registry with the female fitting bevel surface;

the seal comprising a seal body of spring metal and a coating of a relatively soft sealing material on the seal body, the seal body and coating configured to include:

(a) a cylindrical skirt portion having inner and outer parallel surfaces defining the cylindrical skirt thickness, the skirt comprising means for providing an interference fit between the inner skirt surface and the outside cylindrical surface of the male fitting; and (b) a conical portion extending from the cylindrical skirt portion toward the skirt axis and having inner and outer flat parallel surfaces defining the conical portion radial thickness, wherein the angle between the skirt and the outside surface of the conical portion is different from the selected angle of the bevels on the male and female fittings.

2. A seal as is claimed in claim 1, wherein the angle between the skirt and the outside surface of the conical portion is less than the selected angle of the bevels on the male and female fittings.

3. A seal as is claimed in claim 1, wherein the angle between the skirt and the outside surface of the conical portion is greater than the selected angle of the bevels on the male and female fittings.

4. A seal as is claimed in claim 1, wherein the angle of the bevels in the male and female fittings is 37° and the angle between the skirt and the outside surface of the conical portion is 35°.

5. A seal as is claimed in claim 1, wherein the spring metal is Inconel 718.

6. A seal as is claimed in claim 1, wherein the conical portion radial thickness is 0.025 inch and the spring metal is Inconel 718.

7. A seal as is claimed in claim 1, wherein the coating is silver.

8. A seal for use with a tube coupling assembly, the assembly comprising a male fitting, a female fitting, and means for drawing the male and female fittings tightly together;

the male fitting comprising a cylindrical tube having a beveled conical surface on the outside of its end, the bevel being at a selected angle with the outside surface of the cylinder wall;

the female fitting comprising a cylindrical tube having a beveled conical surface on the inside of its end, the bevel being at a selected angle with the inside surface of the cylinder wall, wherein the selected angle for the bevels on the male and female fittings are the same, and the inside diameters of the male and female fittings are such that, when the fittings are drawn together, at least a portion of the male bevel surface is in registry with the female fitting bevel surface;

the seal comprising a seal body of spring metal and a coating of a relatively soft sealing material on the seal body, the seal body and coating configured to include:

(a) a cylindrical skirt portion having inner and outer parallel surfaces defining the cylindrical skirt thickness, the skirt comprising means for providing an interference fit between the inner skirt surface and the outside cylindrical surface of the male fitting; and (b) a conical portion extending from the cylindrical skirt portion toward the skirt axis and having inner and outer parallel surfaces defining the conical portion radial thickness, wherein the angle between the skirt and the outside surface of the conical portion is less than the selected angle of the bevels on the male and female fittings;

the magnitude of the conical portion selected angle being such that, when the seal is mounted on the end of the male fitting, and the means for drawing the male and female fittings together is finger tight, an annular tip portion of the seal's outer conical surface mates with a corresponding annular portion of the female fitting bevel surface, while a gap is present between a tip portion of the inner surface of the seal's conical portion and the male fitting bevel surface.

9. A seal as is claimed in claim 8, wherein the spring metal has a yield strength of greater than 150,000 psi.

10. A seal as is claimed in claim 8, wherein the spring metal is Inconel 718.

11. A seal as is claimed in claim 8, wherein the selected angle for the bevels on the male and female fittings are 37° and the magnitude of the conical portion selected angle is 35°.

12. A seal as is claimed in claim 8, wherein the sealing material is silver.

13. A seal as is claimed in claim 8, wherein the conical portion radial thickness is 0.025 inch and the spring metal is Inconel 718.

14. A seal as is claimed in claim 8, wherein the cylindrical skirt portion has a plurality of internal tabs, the internal tabs being extended slightly inwardly and circumferentially spaced.

15. A seal as is claimed in claim 14, wherein the internal tabs are positioned at approximately 120°.

16. A seal for use with a tube coupling assembly, the assembly comprising a male fitting, a female fitting, and means for drawing the male and female fittings tightly together;

the male fitting comprising a cylindrical tube having a beveled conical surface on the outside of its end, the bevel being at a selected angle with the outside surface of the cylinder wall;

the female fitting comprising a cylindrical tube having a beveled conical surface on the inside of its end, the bevel being at a selected angle with the inside surface of the cylinder wall, wherein the selected angle for the bevels on the male and female fittings are the same, and the inside diameters of the male and female fittings are such that, when the fittings are drawn together, a least a portion of the male bevel surface is in registry with the female fitting bevel surface;

the seal configured for mounting on the male fitting and comprising a seal body comprising a spring metal coated with a relatively soft sealing material, the seal body and coating configured to include:

(a) a cylindrical skirt portion having inner and outer parallel surfaces defining the cylindrical skirt thickness, the skirt comprising means for providing an interference fit between the inner skirt surface and the outside cylindrical surface of the male fitting; and (b) a conical portion extending from the cylindrical skirt portion toward the skirt axis and having inner and outer parallel surfaces defining the conical portion radial thickness, wherein the angle between the skirt and the outside surface of the conical portion is greater than the selected angle of the bevels of the male and female fittings;

the magnitude of the conical portion selected angle being such that, when the seal is mounted on the end of the male fitting, and the means for drawing the male and female fittings together is finger tight, an annular portion of the seal's outer conical surface mates with a tip portion of the female fitting bevel surface, while a gap is present between a remaining portion of the female bevel surface and the outer surface of the conical portion of the seal.

17. A seal as is claimed in claim 16, wherein the spring metal has a yield strength of greater than 150,000 psi.

18. A seal as is claimed in claim 16, wherein the spring metal is Inconel 718.

19. A seal as is claimed in claim 16, wherein the selected angle for the bevels on the male and female fittings are 37° and the magnitude of the conical portion selected angle is 39°.

20. A seal as is claimed in claim 16, wherein the sealing material is silver.

21. A seal as is claimed in claim 16, wherein the conical portion radial thickness is 0.025 inch and the spring metal is Inconel 718.

22. A seal as is claimed in claim 16, wherein the cylindrical skirt portion has a plurality of internal tabs, the internal tabs being extended slightly inwardly and circumferentially spaced.

23. A seal as is claimed in claim 22, wherein the internal tabs are positioned at approximately 120°.

* * * * *